Feb. 26, 1957 H. O. LINSEL 2,782,947
CART OR HAND TRUCK FOR MOVING FURNITURE
Filed Aug. 2, 1954 2 Sheets-Sheet 1
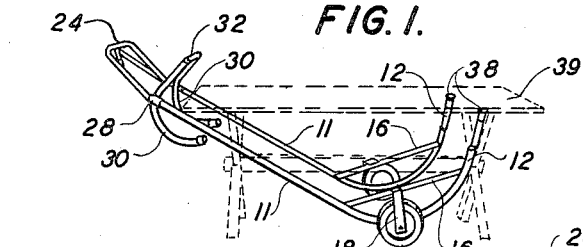
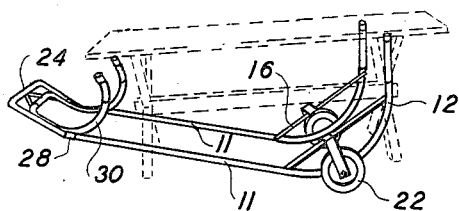
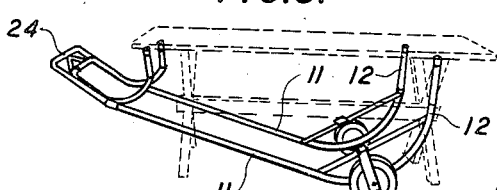
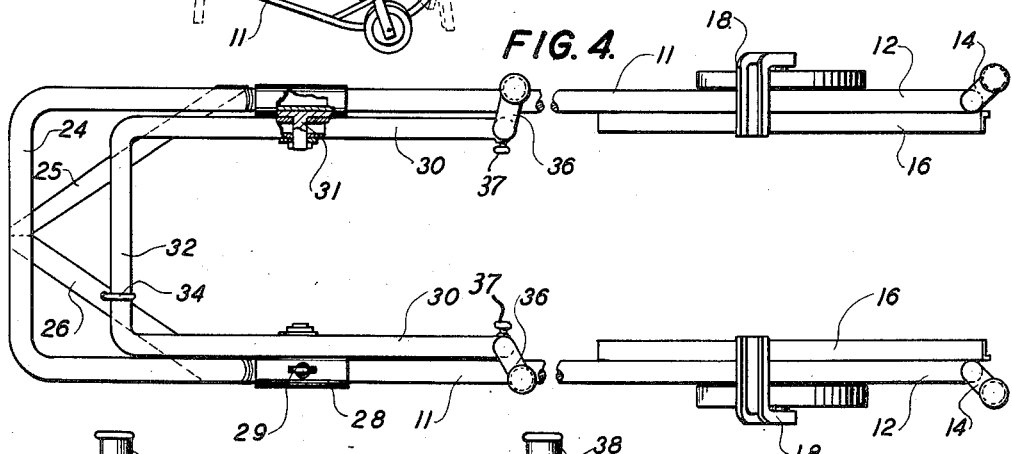
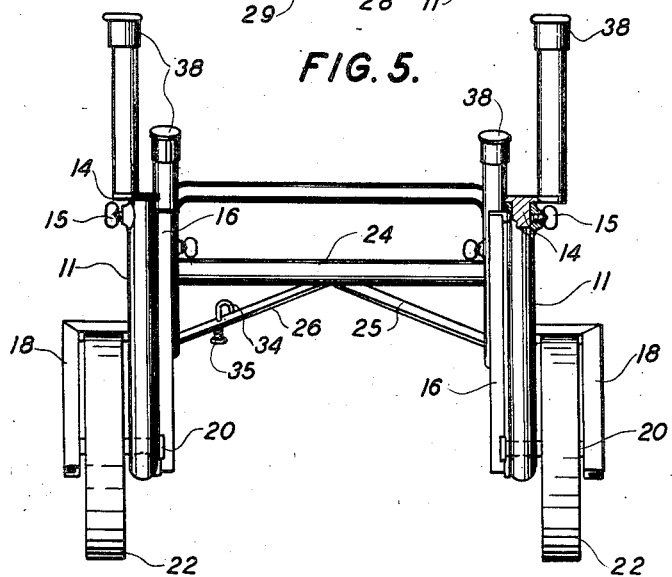
INVENTOR.
HERMAN O. LINSEL
BY
Christie, Parker & Hale
ATTORNEYS

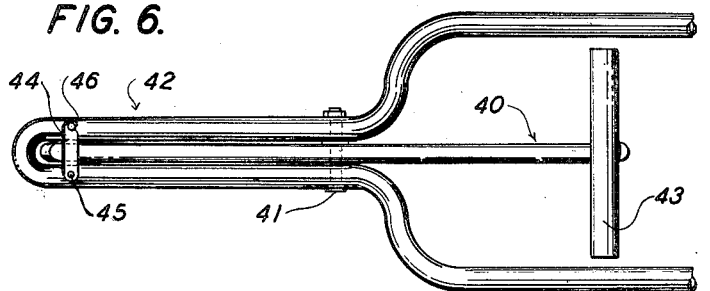
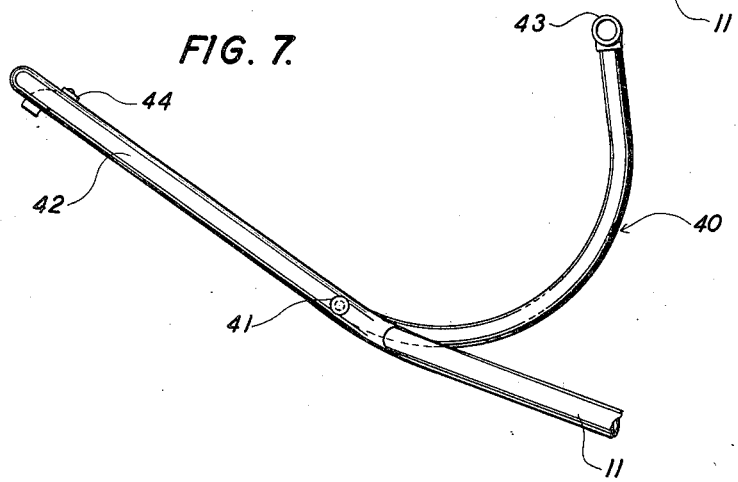
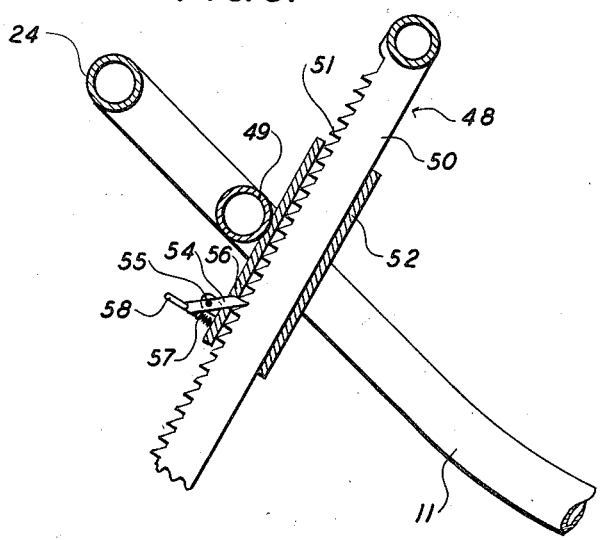

2,782,947

CART OR HAND TRUCK FOR MOVING FURNITURE

Herman O. Linsel, Los Angeles, Calif.

Application August 2, 1954, Serial No. 447,223

5 Claims. (Cl. 214—373)

This invention relates to carts for moving objects such as furniture and the like.

Many objects of furniture, such as tables, are often so large that it is cumbersome or difficult for one man to pick them up and move them. For example, in large dining halls where it is frequently necessary to move a large number of tables in order to facilitate cleaning of the hall, two or more men must be used in the moving of the tables.

This invention provides an inexpensive, light weight cart which can easily be operated by one man to move large tables which ordinarily would require the work of two or more men.

The invention contemplates a cart comprising a pair of spaced elongated side members. An upwardly extending projection is provided at the forward end of each side member and a wheel is mounted on each side member adjacent the lower end of each projection for rotation about a substantially horizontal axis. A vertically adjustable support is attached to the rear portion of the cart and means are provided for holding the support in a fixed position.

Preferably, the support is a pair of upwardly opening U-shaped rocker arms. One rocker arm is attached intermediate its ends to the rear portion of each side member to pivot in a substantially vertical plane. Also, in a preferred form of the invention, means are provided whereby the position of the pivots of the rocker arms can be carried along the length of the side members. Swiveling means are also provided on the projections and the rocker arms so that the position of their upper ends may be varied to accommodate objects of various widths.

These and other aspects of the invention will be more clearly understood in the light of the following detailed description taken in conjunction with the accompanying drawings in which:

Figs. 1, 2 and 3 are perspective views of a presently preferred form of the invention illustrating the various operating procedures for loading a table onto the cart;

Fig. 4 is a plan view, partly broken away, of the cart;

Fig. 5 is a front end elevational view, partly broken away, of the cart;

Fig. 6 is a fragmentary plan view of the rear end of the cart illustrating an alternate form of the support;

Fig. 7 is a fragmentary elevation of the support of Fig. 6; and

Fig. 8 is a vertical section of the rear end of the cart illustrating another arrangement for mounting a vertically adjustable support.

Referring to Figs. 1 through 5, the cart comprises a pair of spaced, elongated side members 11 which extend in the same direction. The forward end of each side member is curved to form an upwardly extending projection 12. A swivel 14 is positioned in the intermediate part of each projection so that the distance between the upper ends of the two projections may be varied as required. A wing nut 15 on each swivel permits the swivels to be locked in any desired position. A brace 16 is attached to each projection underneath its respective swivel and to an intermediate portion of each side member. One end of an L-shaped bracket 18 is rigidly attached to the intermediate portion of each brace. Each bracket extends outwardly and downwardly so that the other end is adjacent its respective side member. An axle 20 extends from the lower end of each L-bracket to its respective side member, and a wheel 22 is rotatably mounted on each axle.

A transverse bar 24 is attached across the rear ends of the side members to form a carrying handle. A pair of carrying handle braces 25 and 26 disposed in the shape of a V, are attached to the cart with the apex of the V attached to the middle of the carrying handle and the outer ends of the V each attached to a respective side member. A slidable bracket 28 in the form of a sleeve is disposed around each side member just forward of where the carrying handle braces join the side members. Each slidable bracket is provided with a set screw 29 threaded through the bracket wall for locking the bracket in any desired position along the side member. An upwardly opening U-shaped rocker arm 30 is pivotally attached to an inwardly extending projection 31 on each slidable bracket so that the rocker arms may be pivoted in a vertical plane about an axis transverse to the cart. A loading handle 32 is attached across the rear ends of the rocker arms. An upwardly extending inverted hook 34 is rotatably attached to one of the carrying handle braces so that it can engage over the loading handle when the rocker arms are pivoted to the position shown in Fig. 3. The lower end of the hook extends down through the handle brace and is threaded to receive a lock nut 35. A compression spring is disposed around the lower end of the hook between the lock nut and the brace to urge the hook downwardly.

Each rocker arm is provided with a swivel 36 in the intermediate portion of the forward ends so that the forward ends of the rocker arms may be adjusted to accommodate objects of various widths. A wing nut 37 on each swivel serves to lock the swivels in any desired position. The upper ends of the rocker arms and the projections are covered with rubber tips 38 to reduce the tendency for the object being carried to slide or be scratched.

The operation of the cart is most readily understood from reference to Figs. 1 through 3 which show the sequence of steps required to load a table onto the cart. The rear end of the cart is raised by lifting the carrying handle. This lowers the upper ends of the projections so that they may be rolled under the forward end of a table 39 (shown in dotted lines). The carrying handle is then depressed so that the projections engage the under side of the table and lift the forward legs to the position shown in dotted lines in Fig. 2. The rocker arms are then pivoted to the rear so that the loading handle rests across the carrying handle braces. The hook is then raised and swung around to hook over the loading handle as shown in Figs. 2 and 3. The carrying handle is then raised until the forward ends of the rocker arms engage the under side of the rear part of the table and raise the rear legs of the table so that all table legs are clear of the floor. The table may then be supported in the position shown in Fig. 3 and easily rolled to any desired location.

Figs. 6 and 7 illustrate an alternate form of a rocker arm 40 which may be used as the rear support on the cart. Its operation is similar to that described for the rocker arms shown in Figs. 1 through 5. This rocker arm comprises a single, upwardly opening, U-shaped member which is pivotally attached intermediate its ends to a cross pin 41 extending through the side members adjacent a point where they are bent inwardly and rearwardly to form a narrow handle 42. The rear end of the rocker arm is adapted to pass between the side members of the handle, except that in the loaded position its upper travel is limited by a latch 44 pivotally secured at one end to a vertical pin 45 on one of the side members and held at its other end by a vertical stop 46. The forward end of the rocker arm is provided with a cross piece 43 which serves to engage the underside of the table when the rocker arm is locked in the carrying position.

Fig. 8 shows another form which the rear support of the cart may take, like reference characters being used to indicate like parts previously described. In this embodiment the rocker arms are replaced by a single vertically adjustable support 48 attached to the center part of a cross bar 49 disposed between the rear portion of the side members. The support comprises a rod 50 having a serrated portion 51 which slides in an upright sleeve 52 attached to the center of the cross bar. The upper end of a pawl 54 pivotally attached intermediate its ends to a projection 55 on the sleeve extends into a side opening 56 in the sleeve to engage the serrations on the rod to prevent downward movement of the rod. The lower end of the pawl is urged outwardly by a compression spring 57 disposed between the lower end of the pawl and the sleeve. A tab 58 is provided on the lower end of the pawl to facilitate moving the upper end of the pawl out of the side opening when the rod is to be moved down.

The operation of the cart with this arrangement is similar to that described for the apparatus Figs. 1 through 5. The forward end of the cart is moved into position as previously described, the support having first been moved to a lower position. With the rear end of the cart depressed, the support is slid up to the proper height through the sleeve and is held in that position by the pawl. The carrying handle is then raised and the table is in position on the cart to be moved as previously described.

I claim:

1. In a cart for moving furniture and the like, the combination comprising a pair of spaced elongated side members, an upwardly extending projection at the forward end of each side member, a wheel mounted on each side member adjacent the lower end of each projection for rotation about a substantially horizontal axis, an upwardly opening U-shaped rocker arm attached intermediate its ends to the rear portion of each side member to pivot in a substantially vertical plane, and locking means for releasably holding the rocker arm in a fixed position with respect to the side members.

2. In a cart for moving furniture and the like, the combination comprising a pair of spaced elongated side members, an upwardly extending projection at the forward end of each side member, a wheel mounted on each side member adjacent the lower end of each projection for rotation about a substantially horizontal axis, and upwardly opening U-shaped rocker arm adjustably attached intermediate its ends to the rear portion of each side member to pivot in a substantially vertical plane, and locking means for releasably holding the rocker arm in a fixed position with respect to the side members.

3. In a cart for moving furniture and the like, the combination comprising a pair of spaced elongated side members, an upwardly extending projection at the forward end of each side member, a wheel mounted on each side member adjacent the lower end of each projection for rotation about a substantially horizontal axis, a transverse bar attached to the rear ends of the side members to form a carrying handle, an upwardly opening U-shaped rocker arm attached intermediate its ends to the rear portion of the side members to pivot in a substantially vertical plane, and locking means for releasably holding the rocker arm in a fixed position with respect to the side members.

4. In a cart for moving furniture and the like, the combination comprising a pair of spaced elongated side members, an upwardly extending projection at the forward end of each side member, a wheel mounted on each side member adjacent the lower end of each projection for rotation about a substantially horizontal axis, a transverse bar attached to the rear ends of the side members to form a carrying handle, a separate upwardly opening U-shaped rocker arm attached intermediate its ends to the rear portion of each side member to pivot in a substantially vertical plane, a transverse member attached to the rearward ends of the two rocker arms to form a loading handle, and locking means for releasably holding the rear members in a fixed position.

5. Apparatus according to claim 4 in the upper portions of the projections and the forward upper portions of the rocker arms are each provided with separate swiveling means.

References Cited in the file of this patent

UNITED STATES PATENTS

| | | |
|---|---|---|
| 1,436,665 | Monro | Nov. 28, 1922 |
| 1,985,362 | Clyde | Dec. 25, 1934 |
| 2,621,815 | Gannon | Dec. 16, 1952 |
| 2,636,626 | Ireland | Apr. 28, 1953 |
| 2,638,236 | Prowinsky et al. | May 12, 1953 |
| 2,681,740 | Schueler | June 22, 1954 |